US011626633B2

(12) United States Patent
Baughman et al.

(10) Patent No.: US 11,626,633 B2
(45) Date of Patent: Apr. 11, 2023

(54) DETERMINATION OF BATTERY MODULE AND SUB-PACK ASSOCIATION IN ELECTRICAL ENERGY STORAGE SYSTEMS

(71) Applicant: GM GLOBAL TECHNOLOGY OPERATIONS LLC, Detroit, MI (US)

(72) Inventors: Andrew C. Baughman, Northville, MI (US); Thomas Timpf, Jr., Royal Oak, MI (US); Christine E. Cabrera, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 326 days.

(21) Appl. No.: 17/007,981

(22) Filed: Aug. 31, 2020

(65) Prior Publication Data
US 2022/0069376 A1 Mar. 3, 2022

(51) Int. Cl.
| | |
|---|---|
| *H01M 10/633* | (2014.01) |
| *H01M 10/613* | (2014.01) |
| *H01M 10/625* | (2014.01) |
| *H01M 10/48* | (2006.01) |
| *H01M 10/42* | (2006.01) |

(52) U.S. Cl.
CPC ..... *H01M 10/633* (2015.04); *H01M 10/4207* (2013.01); *H01M 10/48* (2013.01); *H01M 10/482* (2013.01); *H01M 10/613* (2015.04); *H01M 10/625* (2015.04); *H01M 2220/20* (2013.01)

(58) Field of Classification Search
CPC ............. H01M 10/633; H01M 10/613; H01M 10/625; H01M 10/42; H01M 10/4207; H01M 10/48; H01M 10/482
See application file for complete search history.

(56) References Cited

U.S. PATENT DOCUMENTS

| | | | |
|---|---|---|---|
| 2010/0100266 A1* | 4/2010 | Yoshinori | B60K 1/04 903/904 |
| 2017/0187203 A1* | 6/2017 | Ikeda | H02J 7/0013 |

* cited by examiner

*Primary Examiner* — Karie O'Neill Apicella
(74) *Attorney, Agent, or Firm* — Quinn IP Law (57) ABSTRACT

A battery system with cell groups arranged in modules and with plurality of modules arranged in individual battery sub-packs includes a controller network configured to monitor the sub-packs. The network includes a plurality of cell monitoring units (CMUs); each CMU connected to one module for processing data for respective cell groups. The network also includes multiple voltage sensors on each CMU, with each sensor detecting voltage across one cell group. The network additionally includes an electronic controller programmed with an algorithm and in wireless communication with each CMU. The algorithm identifies when electrical power is disconnected from the RESS and directs electrical current through a selected sub-pack after power is restored. The algorithm also interrogates voltage sensors of a particular CMU, detects a change in voltage triggered by the current, and records a cross-reference between the particular CMU and the selected sub-pack when the change in voltage is detected.

20 Claims, 6 Drawing Sheets

DETERMINATION OF BATTERY MODULE AND SUB-PACK ASSOCIATION IN ELECTRICAL ENERGY STORAGE SYSTEMS

INTRODUCTION

The present disclosure generally relates to determination of an association between a battery module and a battery sub-pack in multi-cell electrical energy storage systems.

An electrical energy storage or battery system or array may include a plurality of battery cells in relatively close proximity to one another. A plurality of battery cells may be assembled into a battery stack or module, and a plurality of battery modules may be assembled into a battery pack. In large battery packs, an individual pack may also be split into separate battery sub-packs, each including an array of battery modules. Batteries may be broadly classified into primary and secondary batteries.

Primary batteries, also referred to as disposable batteries, are intended to be used until depleted of charge, after which they are simply replaced with new batteries. Secondary batteries, more commonly referred to as rechargeable batteries, employ specific high-energy chemistries permitting such batteries to be repeatedly recharged and reused, therefore offering economic, environmental, and ease-of-use benefits compared to disposable batteries. Rechargeable batteries may be used to power such diverse items as toys, consumer electronics, and rotary electric machines, such as electric motors-generators or traction motors for electric propulsion of motor vehicles. Battery cells may be actively depleted of charge during operation of the powered item or through self-discharge during storage.

In an electric vehicle powertrain employing the above-described rotary electric machine, energy is drawn from the cells of the battery system, i.e., the battery cells are actively discharging, whenever the electric powertrain is functioning in a drive or propulsion mode. Depending on the particular configuration of the electric machine, the battery cells may be recharged via an offboard charging station and/or via onboard regeneration. Cell data, such as individual cell or cell group voltages, charging and discharging electrical currents respectively to and from the battery cells or cell groups, and temperature measurements sampled at various locations within the battery system, is collected and closely monitored over time by a battery control unit. The battery control unit is configured to automatically adjust battery control parameters based on the collected cell data.

SUMMARY

A battery system includes a multi-cell rechargeable energy storage system (RESS) having a plurality of battery cell groups arranged in individual battery modules and a plurality of modules arranged in individual battery sub-packs. The battery system also includes a battery controller network configured to monitor the battery sub-packs. The battery controller network includes a plurality of cell monitoring units (CMUs). Each respective one of the CMUs is electrically connected to a respective one of the battery modules and configured to process cell data for the respective cell groups. The battery controller network also includes a plurality of voltage sensors mounted to or positioned on each CMU. Each voltage sensor is configured to detect voltage across one respective cell group.

The battery controller network additionally includes an electronic controller in wireless communication with each of the CMUs and each of the plurality of voltage sensors, and programmed with an algorithm. The algorithm, when executed by the electronic controller, is configured to identify when electrical power is disconnected from the RESS. The algorithm is also configured to direct an electrical current through a selected sub-pack of the RESS sub-packs after electrical power is reconnected to the RESS. The algorithm is additionally configured to interrogate voltage sensors corresponding to a particular CMU to thereby detect a change in voltage triggered by the directed electrical current. The algorithm is further configured to record a cross-reference between the particular CMU and the associated selected sub-pack when the change in voltage is detected.

The algorithm may be also configured to monitor and identify strength of a wireless signal used in the wireless communication between the electronic controller and the particular CMU. The algorithm may be additionally configured to interrogate voltage sensors corresponding to the particular CMU, in response to the directed electrical current, when the identified strength of the wireless signal is greater than a predetermined minimum signal strength.

The algorithm may be also configured to monitor and identify duration of time the electrical power was disconnected from the RESS. The electrical power having been disconnected from the RESS may be identified as a loss of power to the electronic controller. The algorithm may be additionally configured to interrogate voltage sensors corresponding to the particular CMU, in response to the directed electrical current, when the identified duration of time is more than a predetermined minimum duration.

The battery controller network may additionally include a plurality of temperature sensors. At least one of the plurality of temperature sensors may be mounted to or positioned on each of the CMUs and configured to detect temperatures of the associated cell groups. In such an embodiment, the electronic controller may be in wireless communication with each of the plurality of temperature sensors. The algorithm may be also configured to interrogate the respective at least one of the plurality of temperature sensors corresponding to the particular CMU to detect a change in temperature of the particular CMU. The algorithm may be additionally configured to direct a flow of coolant to the corresponding battery module using the detected change in temperature.

The algorithm may be also configured to identify when electrical power is disconnected from the RESS automatically, and additionally configured to trigger a sensory signal when the electrical power is identified as having been disconnected from the RESS.

The algorithm may be additionally configured to monitor and identify a state of charge (SOC) of the selected sub-pack using the recorded cross-reference.

The battery system may additionally include a plurality of current sensors, each current sensor being configured to detect electrical current supplied to the respective battery sub-packs. In such an embodiment, the electronic controller is configured to receive, from each of the plurality of current sensors, signals indicative of the detected electrical current. The algorithm may be also configured to manage a flow of the electrical current to the selected sub-pack using the recorded cross-reference and signals from the current sensor corresponding to the selected sub-pack.

The algorithm may be also configured to trigger the change in voltage across the selected sub-pack via operating a vehicle traction motor connected to the RESS.

The algorithm may be additionally configured to trigger the change in voltage across the selected sub-pack via operating a vehicle high-voltage heater connected to the RESS.

The algorithm may be further configured to trigger the change in voltage across the selected sub-pack via operating a vehicle high-voltage DC charger connected to the RESS.

A method of determining, via a battery controller network, association between a battery module and a battery sub-pack in a multi-cell rechargeable energy storage system (RESS) having a plurality of battery cell groups arranged in individual battery modules and a plurality of modules arranged in individual battery sub-packs, as described above, is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
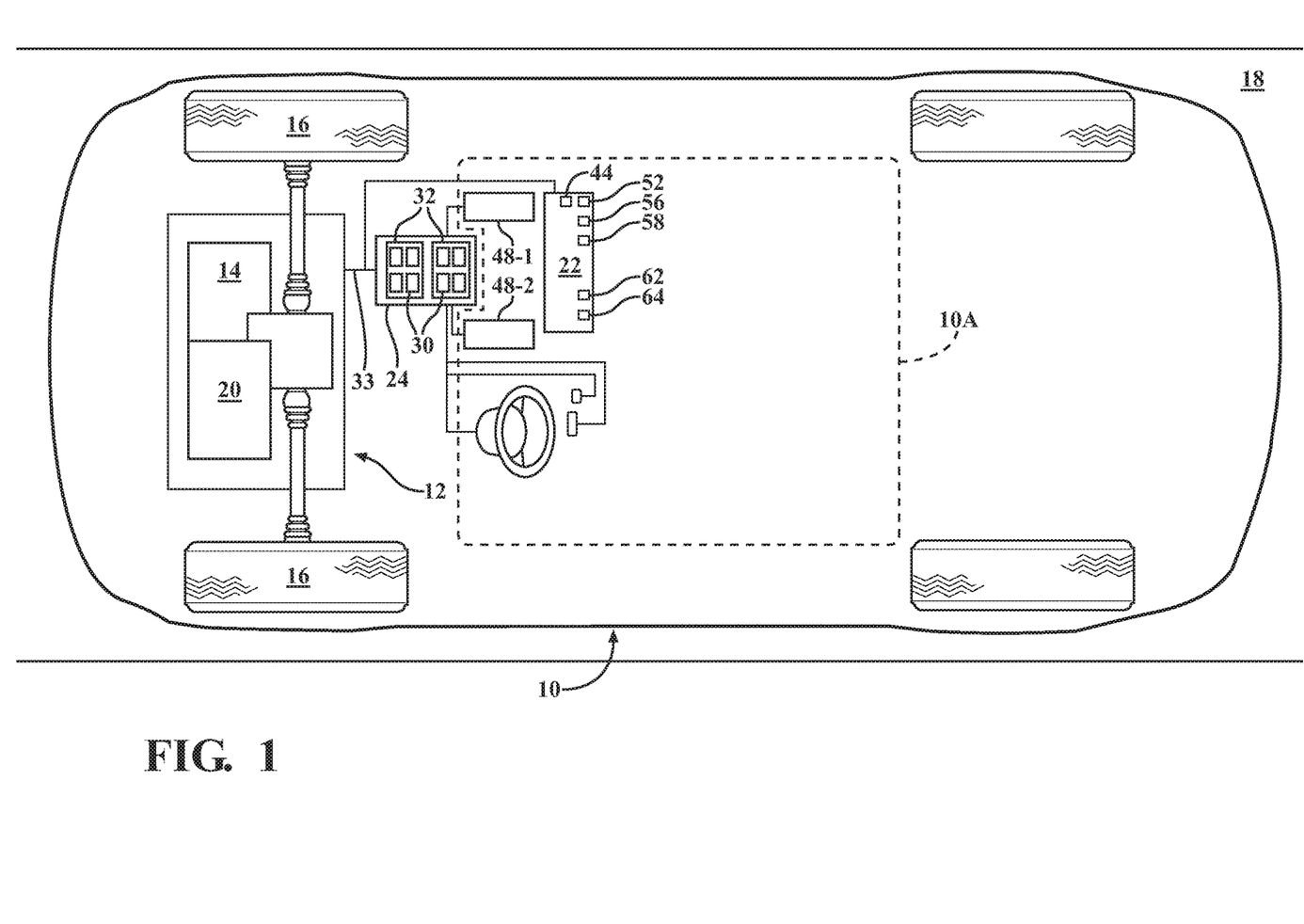
FIG. 1 is a schematic top view of an embodiment of a motor vehicle employing a hybrid powertrain with multiple power-sources, and a battery system configured to generate and store electrical energy for supplying the electrical energy to the power-sources, according to the disclosure.

Referring to FIG. 1, a motor vehicle 10 having a powertrain 12 is depicted. The vehicle 10 may include, but not be limited to, a commercial vehicle, industrial vehicle, passenger vehicle, aircraft, watercraft, train, or the like. It is also contemplated that the vehicle 10 may be a mobile platform, such as an airplane, all-terrain vehicle (ATV), boat, personal movement apparatus, robot, and the like to accomplish the purposes of this disclosure. The powertrain 12 includes a power-source 14 configured to generate a power-source torque T (shown in FIG. 1) for propulsion of the vehicle 10 via driven wheels 16 relative to a road surface 18. The power-source 14 is depicted as an electric traction motor-generator. As shown in FIG. 1, the powertrain 12 may also include an additional power-source 20, such as an internal combustion engine. The power-sources 14 and 20 may act in concert to power the vehicle 10.

Figure 2:
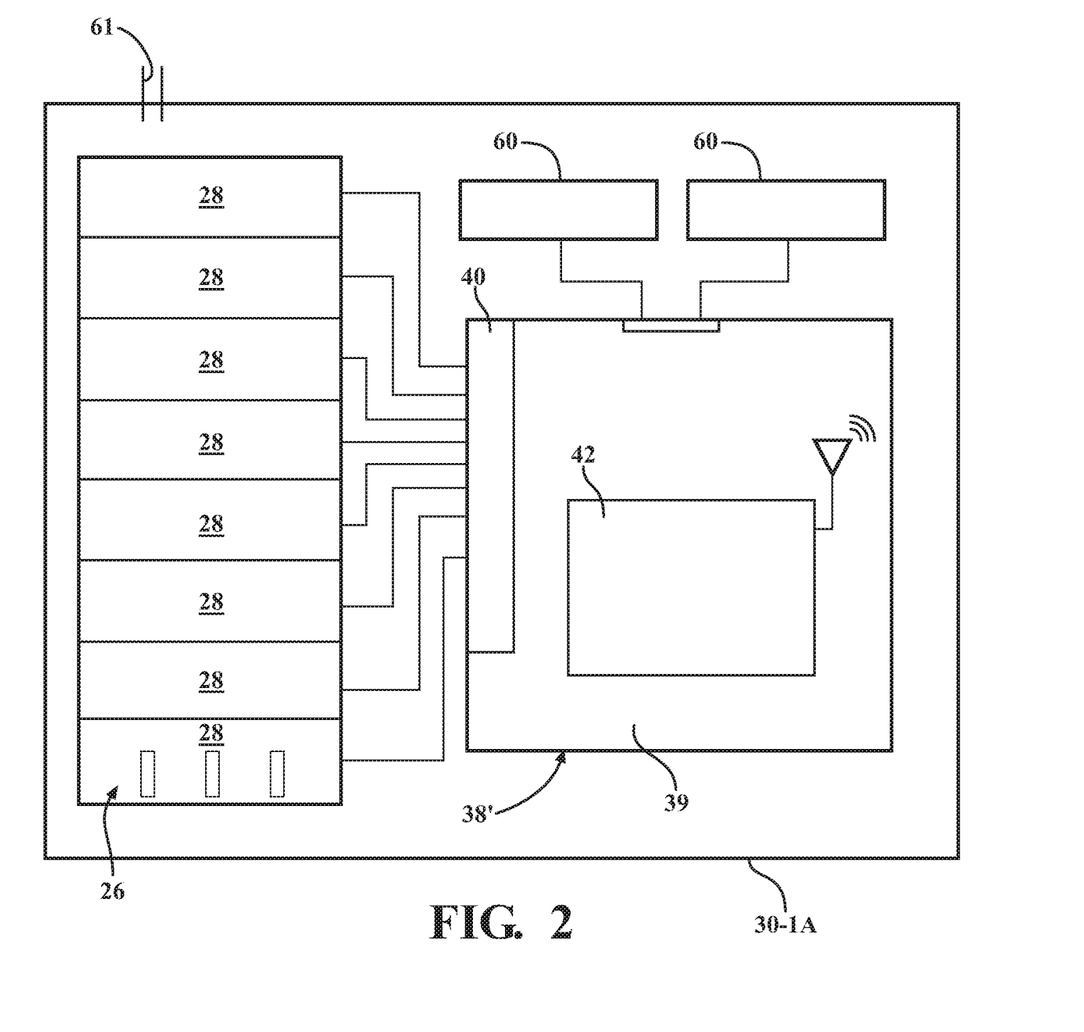
FIG. 2 is a circuit diagram of an individual battery module, including a plurality of battery cell groups connected in series and an associated cell monitoring unit (CMU), according to the disclosure.
Figure 3:
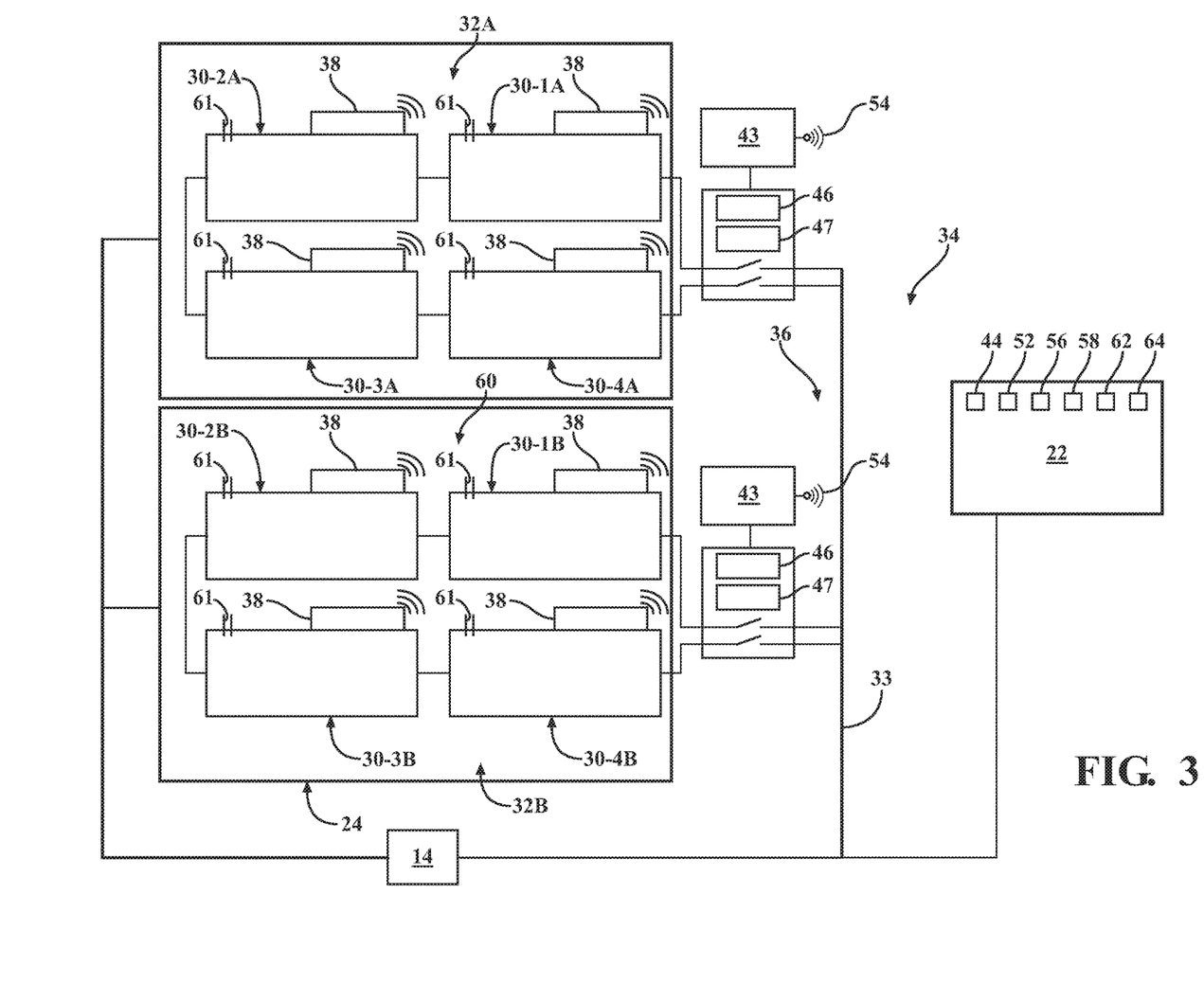
FIG. 3 is a circuit diagram of the battery system shown in FIG. 1, the battery system including a multi-cell rechargeable energy storage system (RESS) with a plurality of battery cell groups arranged in individual battery modules (shown in FIG. 2) and a plurality of modules arranged in individual battery sub-packs, and a battery controller network configured to monitor the battery sub-packs in connection with the vehicle's traction motor, according to the disclosure.
Figure 4:
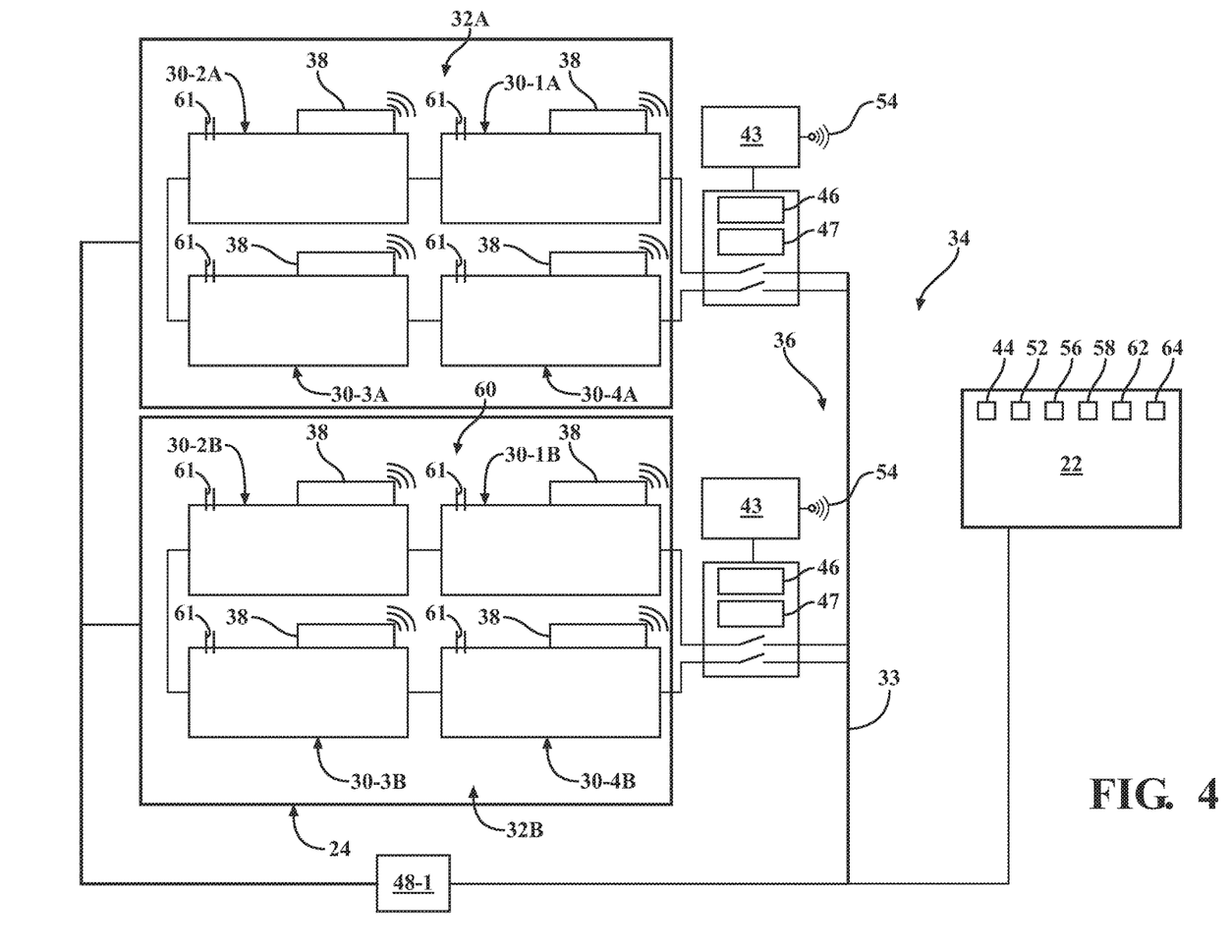
FIG. 4 is a circuit diagram of the battery system shown in FIG. 3, depicting the battery controller network configured to monitor the battery sub-packs in connection with the vehicle's high-voltage heater, according to the disclosure.
Figure 5:
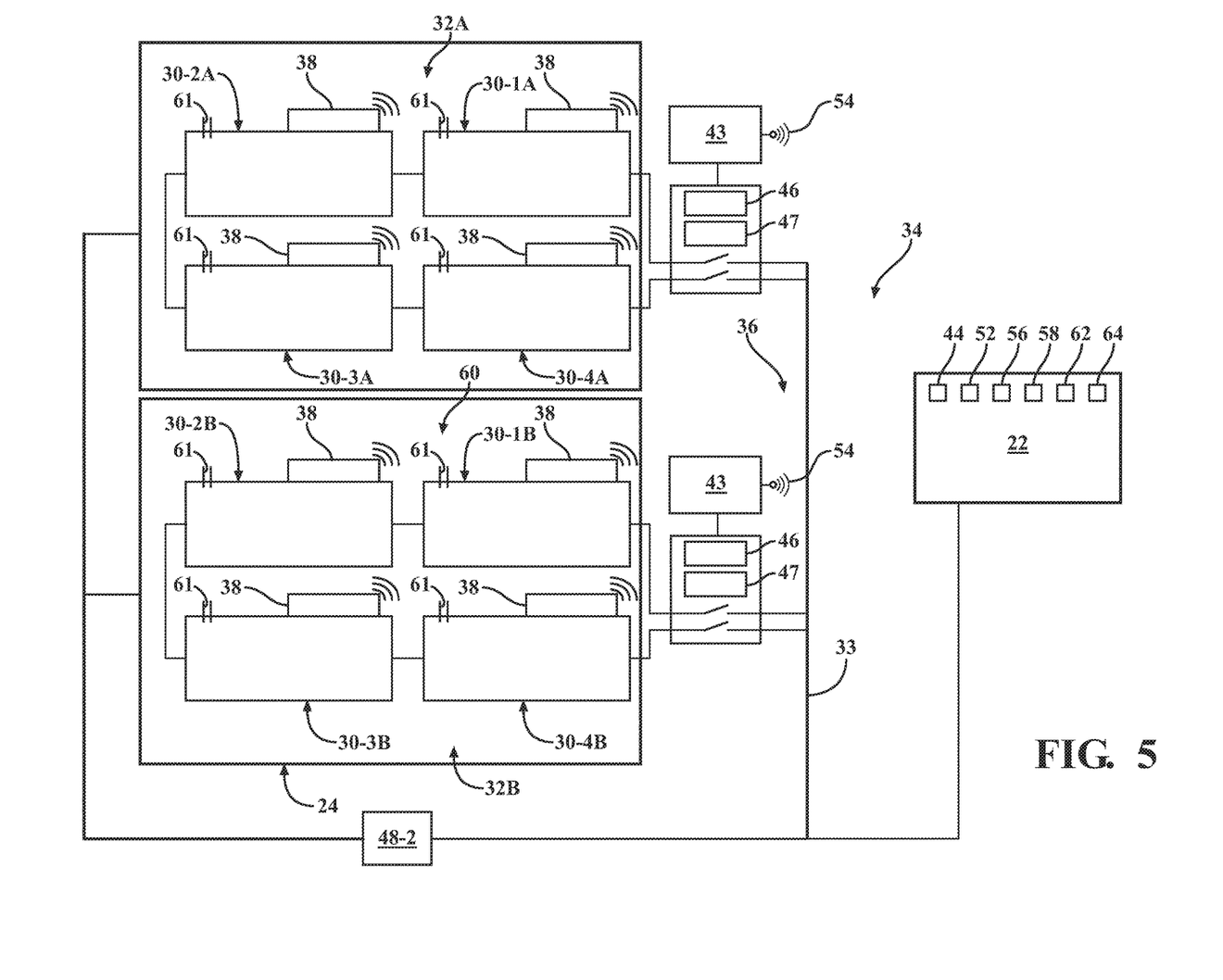
FIG. 5 is a circuit diagram of the battery system shown in FIG. 3, depicting the battery controller network configured to monitor the battery sub-packs in connection with the vehicle's high-voltage DC charger, according to the disclosure.

The vehicle 10 additionally includes a programmable electronic controller 22 and a multi-cell rechargeable energy storage system (RESS) 24. A general structure of the RESS 24 is schematically shown in FIG. 3. As shown in FIG. 2, a plurality of battery cells 26, the battery cells 26 may be initially combined into cell groups 28, where the individual cells may be arranged in parallel. The cell groups 28 may be subsequently organized into battery modules 30, such as modules 30-1A, 30-2A, 30-3A, 30-4A and 30-1B, 30-2B, 30-3B, 30-4B, where the individual cell groups are arranged, i.e., connected, in series (shown in FIG. 3). A plurality of modules 30 are then arranged in individual battery sub-packs, shown as a sub-pack 32A and a sub-pack 32B. Although two battery sub-packs 32A, 32B and eight battery modules 30-1A, 30-2A, 30-3A, 30-4A, and 30-1B, 30-2B, 30-3B, 30-4B are shown, nothing precludes the RESS 24 from having a greater number of such sub-packs, as well as a smaller or greater number of associated battery modules. Operation of the powertrain 12 and the RESS 24 may be generally regulated by the electronic controller 22. The RESS 24 may be connected to the power-sources 14 and 20, the electronic controller 22, as well as other vehicle systems via a high-voltage BUS 33 (shown in FIG. 1).

The RESS 24 is configured to generate and store electrical energy through heat-producing electro-chemical reactions for supplying the electrical energy by being electrically connected to the power-sources 14 and 20. The electronic controller 22 may be programmed to control the powertrain 12 and the RESS 24 to generate a predetermined amount of power-source torque T, and various other vehicle systems. The electronic controller 22 may include a central processing unit (CPU) that regulates various functions on the vehicle 10, or be configured as a powertrain control module (PCM) configured to control the powertrain 12. In either of the above configurations, the electronic controller 22 includes a processor and tangible, non-transitory memory, which includes instructions for operation of the powertrain 12 and the battery system 24 programmed therein. The memory may be an appropriate recordable medium that participates in providing computer-readable data or process instructions. Such a recordable medium may take many forms, including but not limited to non-volatile media and volatile media.

Non-volatile media for the electronic controller 22 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer, or via a wireless connection. Memory of the electronic controller 22 may also include a flexible disk, hard disk, magnetic tape, another magnetic medium, a CD-ROM, DVD, another optical medium, etc. The electronic controller 22 may be configured or equipped with other required computer hardware, such as a high-speed clock, requisite Analog-to-Digital (A/D) and/or Digital-to-Analog (D/A) circuitry, input/output circuitry and devices (I/O), as well as appropriate signal conditioning and/or buffer circuitry. Algorithms required by the electronic controller 22 or accessible thereby may be stored in the memory and automatically executed to provide the required functionality of the powertrain 12 and the RESS 24.

The RESS 24 may also be part of a battery system 34 that includes a battery controller network 36. The battery controller network 36 is generally configured to monitor operation of the RESS 24, and specifically each of the individual battery sub-packs 32A, 32B and the associated battery modules 30-1A, 30-2A, 30-3A, 30-4A and 30-1B, 30-2B, 30-3B, 30-4B. As shown in FIG. 3, the battery controller network 36 includes a plurality of cell monitoring units (CMUs) 38. Each of the cell groups 28 on a respective module 30 is physically wired to an individual CMU 38. Generally, each CMU 38, such as a particular CMU 38' (shown in FIG. 2) arranged on the associated battery module 30-1A of the sub-pack 32A, is configured as a circuit board assembly and includes two separate integrated circuits—an application specific integrated circuit (ASIC) and a system on chip (SoC). An ASIC generally includes voltage sensor and temperature sensor inputs for the particular module 30. The ASIC generally measures and reports sensor data at the request of a microprocessor. System on chip (SoC) generally includes a microprocessor in communication with the ASIC through a basic serial data connection, as well as onboard memory and a radio transceiver, as will be described in greater detail below. Specifically, as schematically depicted in FIGS. 2 and 3, each respective one of the CMUs 38 is electrically connected to a respective one of the battery modules 30 and configured to process cell data for the respective cell groups 28.

The battery controller network 36 also includes a plurality of voltage sensors 40 mounted to or positioned on each CMU 38, such as on the particular CMU 38' arranged on the associated battery module 30-1A (shown in FIG. 2). Each voltage sensor 40 is electrically connected to terminals of a particular battery cell group 28 and configured to detect voltage V across the subject cell group 28. With continued reference to FIG. 2, the battery controller network 36 includes a plurality of system on chips (SoC) or microchips 42. Each microchip 42 is arranged on a respective one of the CMUs 38, such as the particular CMU 38', in communication with, e.g., electrically connected via a printed circuit board (PCB) 39, to the respective voltage sensors 40. The microchips 42 are configured to gather cell data for the respective battery modules 30 and wirelessly transmit, via associated antennas, gathered cell data for the respective cell groups 28 to a battery radio frequency module (BRFM) 43. The BRFM 43 includes a respective microchip and an antenna for receiving wireless data from the CMUs 38.

The electronic controller 22 is in wireless communication with each of the CMUs 38 via the BRFM 43, and thus in communication with each of the plurality of voltage sensors 40. The electronic controller 22 is programmed with an algorithm 44 that, when executed by the electronic controller, is configured to monitor the RESS 24. Specifically, the algorithm 44 is configured to identify when electrical power P is disconnected from the RESS 24, which may, for example, be identified as a loss of 12V power to the electronic controller 22. The algorithm 44 is also configured to select one of the sub-packs 32A and 32B, such as the sub-pack 32A (shown in FIG. 3), and direct an electrical current/through thus selected sub-pack 32B after electrical power P is reconnected to the RESS 24. The battery controller network 36 may additionally include a plurality of sub-pack current sensors 46 and sub-pack voltage sensors 47. Each of the current sensors 46 is configured to detect an electrical current I being supplied to the respective battery sub-pack 32A or 32B, while each of the sub-pack voltage sensors 47 is configured to detect a voltage V across the respective battery sub-pack.

The algorithm 44 is additionally configured to interrogate voltage sensors 40 specifically associated with, i.e., corresponding to, the particular CMU 38' arranged on the associated battery module 30-1A (shown in FIG. 2) to detect a change in voltage V triggered by, i.e., in response to, the electrical current I directed through the selected sub-pack 32A. As shown in FIG. 3, the algorithm 44 may be configured to trigger the change in voltage V across the selected sub-pack 32A via operating the electric motor-generator 14. Alternatively, as also shown in FIG. 3, the algorithm 44 may be configured to trigger the change in voltage V across the selected sub-pack 32A via connection to another electrical load being connected to the RESS 24, such as a high-voltage heater 48-1 configured to generate thermal energy for the vehicle's passenger cabin 10A or a high-voltage DC charger 48-2 configured to generate electrical power for the selected sub-pack 32A.

The algorithm 44 is additionally configured to record a cross-reference 52 between the particular CMU 38' and the associated selected sub-pack 32A when the change in voltage Vis detected. The electronic controller 22 may be configured to receive, from each of the plurality of current sensors 46, signals indicative of the detected electrical current. In such an embodiment, the algorithm 44 may be additionally configured to manage a flow of the electrical current I to the selected sub-pack 32A using the recorded cross-reference 52 and signals from the current sensor 46 corresponding to the selected sub-pack 32A. The algorithm 44 may be also configured to monitor and identify strength of a wireless signal 54 used in the wireless communication between the electronic controller 22 and the particular CMU 38'. In such an embodiment, the algorithm 44 may be additionally configured to interrogate voltage sensors 40 corresponding to the particular CMU 38', in response to the directed electrical current I, when the identified strength of the wireless signal 54 is greater than a predetermined minimum signal strength 56 programmed into the electronic controller 22.

The algorithm 44 may be additionally configured to monitor and identify duration of time t the electrical power P was disconnected from the RESS 24. In such an embodiment, the algorithm 44 may be further configured to interrogate voltage sensors 40 corresponding to the particular CMU 38', in response to the directed electrical current I, when the identified duration of time t is more than a predetermined minimum duration 58 programmed into the electronic controller 22. The battery controller network 36 additionally includes a plurality of temperature sensors 60, e.g., thermistors. At least one of the plurality of temperature sensors 60 may be mounted to or positioned on each of the CMUs 38 to detect temperatures T of the associated cell groups 28. As shown in FIG. 2, each CMU 38 may employ two individual temperature sensors 60, for example, proximate to distal ends of the module 30, for enhanced accuracy of the temperature data. Due to the temperature sensors 60 being arranged on the respective CMUs 38, the electronic controller 22 may be in wireless communication with each of the plurality of temperature sensors 60 via the BRFM 43.

The algorithm 44 may be additionally configured to interrogate the respective temperature sensors 60 corresponding to the particular CMU to detect a change in temperature T of the particular CMU 38'. The algorithm 44 may be further configured to direct a flow of coolant to the corresponding battery module using the detected change in temperature T. Such direction of the coolant 61 may employ a series of fluid valves (not shown) for respective modules 30 and be used to avert a thermal runaway in the selected sub-pack 32A and the corresponding battery module, i.e., one of the modules 30-1A, 30-2A, 30-3A, and 30-4A. In general, the term "thermal runaway" refers to an uncontrolled increase in temperature in a battery system. During a thermal runaway event, the generation of heat within a battery system or a battery cell exceeds the dissipation of heat, thus leading to a further increase in temperature and spread to neighboring cells. Generally, a thermal runaway event may be triggered by several conditions, including a short circuit within the cell, improper cell use, physical abuse, manufacturing defects, or exposure of the cell to extreme external temperatures.

The algorithm 44 may be configured to automatically identify when electrical power P is disconnected from the RESS 24, i.e., without an additional command from the electronic controller 22 or other, external source. In such an embodiment, the algorithm 44 may also be configured to trigger a sensory signal 62, such as set a malfunction indicator light (MIL) and generate and store an error code within the memory of the electronic controller 22. Furthermore, the algorithm 44 may be configured to disable propulsion of the vehicle 10 when the electrical power P is identified as having been disconnected from the RESS 24. The algorithm 44 may also be configured to monitor and identify a state of charge (SOC) 64 of the selected sub-pack 32A using the recorded cross-reference 52.

Generally, modules employing cell groups having comparable levels of degradation perform more effectively. In a service application, a degraded cell module 30 in one of the sub-packs 32 of a particular vehicle's RESS 24 may be replaced with a service cell module exhibiting appropriate cell performance, such as cell discharge rates and other characteristics, in order to maximize service life of the subject RESS. The algorithm 44 of the electronic controller 22 may then be employed to identify the newly installed cell module and store its position in the corresponding sub-pack using the established cross-reference 52, such as between the particular CMU 38' arranged on the associated battery module 30-1A and the associated selected sub-pack 32A, when the electrical current I is directed to the particular sub-pack and a change in voltage V across the subject sub-pack is detected. The algorithm 44 may thus be used to identify every cell module's position in each sub-pack within the RESS 24 for subsequent monitoring of the respective cell modules' performance.

Figure 6:
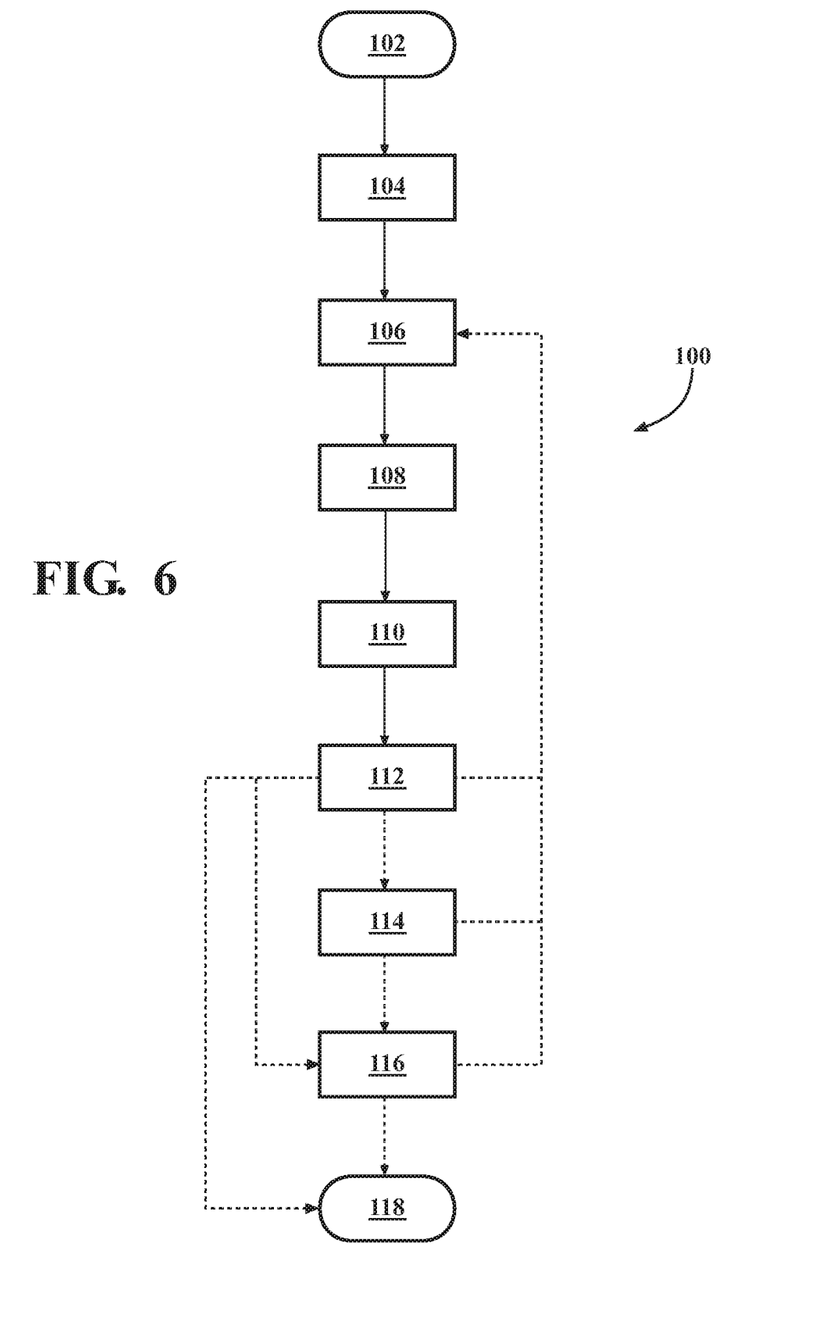
FIG. 6 illustrates a method of determining association between a battery module and a battery sub-pack in the RESS shown in FIGS. 1-5.

A method 100 of determining association between an individual battery module 30 and a battery sub-pack 32 in the RESS 24 is shown in FIG. 6 and described below with reference to the structure shown in FIGS. 1-5. Method 100 commences in frame 102 with identifying, via the algorithm 44, when electrical power P is disconnected from the RESS 24. In frame 102, the method may also include setting, via the algorithm 44, the sensory signal 62 when the electrical power P is identified as having been disconnected from the RESS 24. Following frame 102, the method advances to frame 104. In frame 104, the method includes detecting when the electrical power P is reconnected to the RESS 24. From frame 104, the method moves on to frame 106, where the method includes selecting, via the algorithm 44, the sub-pack 32A of the RESS 24 for analysis of association of battery modules 30 and battery sub-packs 32.

In frame 106, the method may also include monitoring and identifying, via the algorithm 44, strength of the wireless signal 54 used in the wireless communication between the electronic controller 22 and the particular CMU 38'. Also in frame 106, as discussed with respect to FIGS. 1-5, the method may further include interrogating, via the algorithm 44, the voltage sensors 40 corresponding to the particular CMU 38' when the identified strength of the wireless signal 54 is greater than the predetermined minimum signal strength 56. Additionally, in frame 106, the method may include monitoring and identifying, via the algorithm 44, duration of time t the electrical power P was disconnected from the RESS 24.

In frame 106, the method may additionally include interrogating, via the algorithm 44, voltage sensors 40 corresponding to the particular CMU 38' when the identified duration of time t is more than a predetermined minimum duration 58. After frame 106, the method advances to frame 108. In frame 108, the method includes directing, via the algorithm 44, electrical current I through the selected sub-pack 32A. Following frame 108, the method proceeds to frame 110. In frame 110, the method includes interrogating, via the algorithm 44, voltage sensors 40 corresponding to the particular CMU 38' to detect a change in voltage V triggered by the directed electrical current I. After the detection of the change in voltage V in frame 110, the method advances to frame 112. In frame 112 the method includes recording, via the algorithm 44, the cross-reference 52 between the particular CMU 38' and the associated selected sub-pack 32A when the change in voltage V has been detected.

After frame 112, the method may advance to frame 114, where the method includes monitoring and identifying, via the algorithm 44, an SOC of the selected sub-pack 32A using the recorded cross-reference 52. Also, in frame 114, the method may include interrogating, via the algorithm 44, the respective temperature sensor(s) 60 corresponding to the particular CMU 38' to detect a change in temperature T of the particular CMU. In frame 112, the method may further include directing or commanding routing of the flow of coolant 61 to the corresponding battery module 30-1A of the selected sub-pack 32A, via the algorithm 44, using, i.e., based on, the detected change in temperature T data. After the electrical power P is detected as having been reconnected to the RESS 24 in frame 106, the method proceeds to frame 108. After either frame 112 or frame 114, the method may proceed to frame 116.

In frame 116, the method includes receiving, via the electronic controller 22, from each of the plurality of current sensors 46, signals indicative of the detected electrical current I. As part of frame 116, and as discussed with respect to FIGS. 1-5, the method may also include managing, via the algorithm 44, a flow of the electrical current I to the selected sub-pack 32A using the recorded cross-reference 52 and signals from the current sensor 46 corresponding to the selected sub-pack. Following either of the frames 112, 114, or 116, the method may loop back to frame 106 for another control cycle of determining association between a particular battery module 30 and an associated battery sub-pack 32 in the RESS 24 via the battery controller network 36. The method may repeat frames 102-116 until each battery module 30 in the RESS 24 is associated with a respective battery sub-pack 32 and the subject cross-reference has been recorded. Alternatively, the method may conclude in frame 118.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A battery system comprising:
   a multi-cell rechargeable energy storage system (RESS) having a plurality of battery cell groups arranged in individual battery modules and a plurality of modules arranged in individual battery sub-packs; and
   a battery controller network configured to monitor the battery sub-packs, the battery controller network including:
   a plurality of cell monitoring units (CMUs), each respective one of the CMUs being electrically connected to a respective one of the battery modules and configured to process cell data for the respective cell groups;
   a plurality of voltage sensors mounted to or positioned on each CMU, each voltage sensor being configured to detect voltage across one respective cell group; and
   an electronic controller in wireless communication with each of the CMUs and each of the plurality of voltage sensors, and programmed with an algorithm that, when executed by the electronic controller, is configured to:
   identify when electrical power is disconnected from the RESS;
   direct an electrical current through a selected sub-pack of the RESS sub-packs after electrical power is reconnected to the RESS;
   interrogate voltage sensors corresponding to a particular CMU to thereby detect a change in voltage triggered by the directed electrical current; and
   record a cross-reference between the particular CMU and the associated selected sub-pack when the change in voltage is detected.

2. The battery system of claim 1, wherein the algorithm is additionally configured to:
   monitor and identify strength of a wireless signal used in the wireless communication between the electronic controller and the particular CMU; and
   interrogate voltage sensors corresponding to the particular CMU when the identified strength of the wireless signal is greater than a predetermined minimum signal strength.

3. The battery system of claim 1, wherein the algorithm is additionally configured to:
   monitor and identify duration of time the electrical power was disconnected from the RESS; and
   interrogate voltage sensors corresponding to the particular CMU when the identified duration of time is more than a predetermined minimum duration.

4. The battery system of claim 1, wherein:
   the battery controller network additionally includes a plurality of temperature sensors, at least one of the plurality of temperature sensors being mounted to or positioned on each of the CMUs and configured to detect temperatures of the associated cell groups;
   the electronic controller is in wireless communication with each of the plurality of temperature sensors; and
   the algorithm is additionally configured to:
   interrogate the respective at least one of the plurality of temperature sensors corresponding to the particular CMU to detect a change in temperature of the particular CMU; and
   direct a flow of coolant to the corresponding battery module using the detected change in temperature.

5. The battery system of claim 1, wherein the algorithm is configured to identify when electrical power is disconnected from the RESS automatically, and is additionally configured to trigger a sensory signal when the electrical power is identified as having been disconnected from the RESS.

6. The battery system of claim 1, wherein the algorithm is additionally configured to monitor and identify a state of charge (SOC) of the selected sub-pack using the recorded cross-reference.

7. The battery system of claim 1, further comprising a plurality of current sensors, each current sensor being configured to detect electrical current supplied to the respective battery sub-packs, wherein:
   the electronic controller is configured to receive, from each of the plurality of current sensors, signals indicative of the detected electrical current; and
   the algorithm is additionally configured to manage a flow of the electrical current to the selected sub-pack using the recorded cross-reference and signals from the current sensor corresponding to the selected sub-pack.

8. The battery system of claim 1, wherein the algorithm is configured to trigger the change in voltage across the selected sub-pack via operating a vehicle traction motor connected to the RESS.

9. The battery system of claim 1, wherein the algorithm is configured to trigger the change in voltage across the selected sub-pack via operating a vehicle high-voltage heater connected to the RESS.

10. The battery system of claim 1, wherein the algorithm is configured to trigger the change in voltage across the selected sub-pack via operating a vehicle high-voltage DC charger connected to the RESS.

11. A method of determining, via a battery controller network, association between a battery module and a battery sub-pack in a multi-cell rechargeable energy storage system (RESS) having a plurality of battery cell groups arranged in individual battery modules and a plurality of modules arranged in individual battery sub-packs, the method comprising:
   identifying, via an algorithm programmed into an electronic controller, when electrical power is disconnected from the RESS;
   directing, via the algorithm, an electrical current through a selected sub-pack of the RESS sub-packs after electrical power is reconnected to the RESS;
   interrogating, via the algorithm, voltage sensors corresponding to a particular CMU to thereby detect a change in voltage triggered by the directed electrical current, wherein the plurality of voltage sensors is mounted to or positioned on each of a plurality of cell monitoring units (CMUs) in the battery controller network, each voltage sensor being configured to detect voltage across one respective cell group, wherein each respective CMU is electrically connected to a respective one of the battery modules and configured to process cell data for the respective battery cell groups, and wherein the electronic controller is in wireless communication with each of the CMUs and each of the plurality of voltage sensors; and recording, via the algorithm, a cross-reference between the particular CMU and the associated selected sub-pack when the change in voltage is detected.

12. The method of claim 11, further comprising:
monitoring and identifying, via the algorithm, strength of a wireless signal used in the wireless communication between the electronic controller and the particular CMU; and
interrogating, via the algorithm, voltage sensors corresponding to the particular CMU when the identified strength of the wireless signal is greater than a predetermined minimum signal strength.

13. The battery system of claim 11, further comprising:
monitoring and identifying, via the algorithm, duration of time the electrical power was disconnected from the RESS; and
interrogating, via the algorithm, voltage sensors corresponding to the particular CMU when the identified duration of time is more than a predetermined minimum duration.

14. The method of claim 11, wherein:
the battery controller network additionally includes a plurality of temperature sensors, at least one of the plurality of temperature sensors being mounted to or positioned on each of the CMUs and configured to detect temperatures of the associated cell groups; and
the electronic controller is in wireless communication with each of the plurality of temperature sensors;
the method further comprising:
interrogating, via the algorithm, the respective at least one of the plurality of temperature sensors corresponding to the particular CMU to detect a change in temperature of the particular CMU; and
directing a flow of coolant to the corresponding battery module using the detected change in temperature.

15. The method of claim 14, wherein identifying when electrical power is disconnected from the RESS is accomplished via the algorithm automatically, the method further comprising triggering, via the algorithm, a sensory signal when the electrical power is identified as having been disconnected from the RESS.

16. The method of claim 11, further comprising monitoring and identifying, via the algorithm, a state of charge (SOC) of the selected sub-pack using the recorded cross-reference.

17. The method of claim 11, wherein the battery controller network additionally includes a plurality of current sensors, each current sensor being configured to detect electrical current supplied to the respective battery sub-packs, the method further comprising:
receiving, via the electronic controller, from each of the plurality of current sensors, signals indicative of the detected electrical current; and
managing, via the algorithm, a flow of the electrical current to the selected sub-pack using the recorded cross-reference and signals from the current sensor corresponding to the selected sub-pack.

18. The method of claim 11, triggering, via the algorithm, the change in voltage across the selected sub-pack via operating a vehicle traction motor connected to the RESS.

19. The method of claim 11, triggering, via the algorithm, the change in voltage across the selected sub-pack via operating a vehicle high-voltage heater connected to the RESS.

20. The method of claim 11, triggering, via the algorithm, the change in voltage across the selected sub-pack via operating a vehicle high-voltage DC charger connected to the RESS.

* * * * *